United States Patent
Kondadadi et al.

(10) Patent No.: US 11,921,761 B2
(45) Date of Patent: Mar. 5, 2024

(54) METHOD, APPARATUS AND COMPUTER PROGRAM PRODUCT FOR IMPROVING DEEP QUESTION-ANSWERING (QA) APPLICATIONS USING FEEDBACK FROM RETRIEVAL QA APPLICATIONS

(71) Applicant: Optum, Inc., Minnetonka, MN (US)

(72) Inventors: Ravi Kondadadi, Minnetonka, MN (US); Stephen G. Graham, Minnetonka, MN (US); Rick A. Hamilton, Charlottesville, VA (US); Dmitry Rekesh, Minnetonka, MN (US)

(73) Assignee: Optum, Inc., Minnetonka, MN (US)

( * ) Notice: Subject to any disclaimer, the term of this patent is extended or adjusted under 35 U.S.C. 154(b) by 204 days.

(21) Appl. No.: 16/178,719

(22) Filed: Nov. 2, 2018

(65) Prior Publication Data

US 2020/0142996 A1    May 7, 2020

(51) Int. Cl.
*G06F 16/332* (2019.01)
*G06F 16/33* (2019.01)
*G06N 3/08* (2023.01)

(52) U.S. Cl.
CPC ...... *G06F 16/3329* (2019.01); *G06F 16/3326* (2019.01); *G06F 16/3334* (2019.01); *G06N 3/08* (2013.01)

(58) Field of Classification Search
CPC .......................... G06F 16/3329; G06F 16/3326
See application file for complete search history.

(56) References Cited

U.S. PATENT DOCUMENTS

| | | | |
|---|---|---|---|
| 7,519,529 B1 | 4/2009 | Horvitz | |
| 7,809,664 B2* | 10/2010 | Heck | G06Q 10/10 |
| | | | 706/46 |
| 9,158,773 B2 | 10/2015 | Clark et al. | |
| 9,230,009 B2 | 1/2016 | Alkov et al. | |
| 9,558,448 B2 | 1/2017 | Allen et al. | |
| 9,720,981 B1* | 8/2017 | Boguraev | G06F 16/2423 |
| 9,767,094 B1* | 9/2017 | Beller | G06F 16/3329 |
| 9,946,747 B2* | 4/2018 | Barker | G06F 16/9535 |
| 10,706,846 B1* | 7/2020 | Barton | G10L 15/22 |
| 2007/0094285 A1 | 4/2007 | Agichtein et al. | |
| 2010/0191686 A1* | 7/2010 | Wang | G06F 16/33 |
| | | | 706/46 |
| 2011/0125734 A1 | 5/2011 | Duboue et al. | |
| 2011/0320187 A1 | 12/2011 | Motik et al. | |
| 2013/0132308 A1* | 5/2013 | Boss | G16H 50/20 |
| | | | 706/12 |
| 2014/0172880 A1 | 6/2014 | Clark et al. | |

(Continued)

FOREIGN PATENT DOCUMENTS

WO    WO-2018157804 A1 *    9/2018    ............... G06N 5/00

OTHER PUBLICATIONS

Ferrucci, This is Watson, IBM 2012 (Year: 2012).*

(Continued)

*Primary Examiner* — Brittany N Allen
(74) *Attorney, Agent, or Firm* — Alston & Bird LLP

(57) ABSTRACT

Methods, apparatus, systems, computing devices, computing entities, and/or the like for a hybrid question-answering (QA) application are provided. The hybrid QA application includes both a retrieval QA application and a deep QA application, and uses feedback from the retrieval QA application to improve the deep QA application.

19 Claims, 11 Drawing Sheets

(56) References Cited

U.S. PATENT DOCUMENTS

| | | | |
|---|---|---|---|
| 2014/0172883 A1 | 6/2014 | Clark et al. | |
| 2014/0258286 A1* | 9/2014 | Brown | G06F 16/3329 707/728 |
| 2014/0358890 A1* | 12/2014 | Chen | G06F 16/9535 707/710 |
| 2015/0340032 A1* | 11/2015 | Gruenstein | G06N 3/08 704/232 |
| 2016/0148114 A1* | 5/2016 | Allen | G06N 20/00 706/11 |
| 2016/0253596 A1 | 9/2016 | Goth et al. | |
| 2017/0039293 A1* | 2/2017 | Kummamuru | G06F 16/3329 |
| 2017/0098172 A1* | 4/2017 | Ellenbogen | G06N 7/06 |
| 2017/0161363 A1 | 6/2017 | Cortis et al. | |
| 2018/0020094 A1* | 1/2018 | Marrelli | H04M 3/5175 |
| 2018/0181573 A1 | 6/2018 | Zhao | |
| 2019/0228099 A1* | 7/2019 | Bajaj | G06N 3/08 |
| 2020/0019642 A1* | 1/2020 | Dua | G06F 16/3347 |
| 2020/0026770 A1* | 1/2020 | Li | G06N 5/02 |
| 2020/0042643 A1* | 2/2020 | Carrier | G06N 5/003 |
| 2020/0050942 A1* | 2/2020 | Sun | G06F 40/40 |

OTHER PUBLICATIONS

Asakiewicz et al., Building a Cognitive Application using Watson Deep QA, IT Pro, IEEE 2017 (Year: 2017).*

Jurafsky et al. "Question Answering," Speech and Language Processing, Chapter 28, Draft of Aug. 7, 2017, (19 pages).

Lee et al. "Training IBM Watson Using Automatically Generated Question-Answer Pairs,"Nov. 12, 2016, (9 pages). [Retrieved from the Internet Aug. 22, 2016] <https://arxiv.org/abs/1611.03932>.

Levy, Nat. "Microsoft and Alibaba AI Programs Beat Humans In Stanford Reading Comprehension Test For 1st Time," Jan. 15, 2018, (8 pages). [Retrieved from the Internet Aug. 22, 2019] <https://www.geekwire.com/2018/microsoft-alibaba-ai-programs-beat-humans-stanford-reading-test-1st-time/>.

Natural Language Computing Group. "R-Net: Machine Reading Comprehension With Self-Matching Networks," Microsoft Research Asia, May 8, 2017, pp. 1-11. [Retrieved from the Internet Aug. 22, 2019] <https://web.archive.org/web/20180105035052/https://www.microsoft.com/en-us/research/publication/mrc/>.

Xiong, Caiming et al. "Dynamic Coattention Networks For Question Answering," Published As A Conference Paper At ICLR 2017, pp. 1-14, Salesforce Research, Palo Alto, California. [Retrieved from the Internet Aug. 22, 2018] <https://arxiv.org/abs/1611.01604>.

Grau, Brigitte et al. "A Corpus For Hybrid Question Answering Systems," Track: First International Workshop On Hybrid Question Answering With Structured and Unstructured Knowledge (HQA'18), WWW 2018, Apr. 23-27, 2018, pp. 1081-1086, Lyon, France.

United States Patent and Trademark Office, NonFinal Office Action for U.S. Appl. No. 16/178,744, dated Jun. 10, 2020, (9 pages), USA.

United States Patent and Trademark Office, Notice of Allowance and Fees Due for U.S. Appl. No.16/178,744, dated Jul. 31, 2020, (8 pages), USA.

* cited by examiner

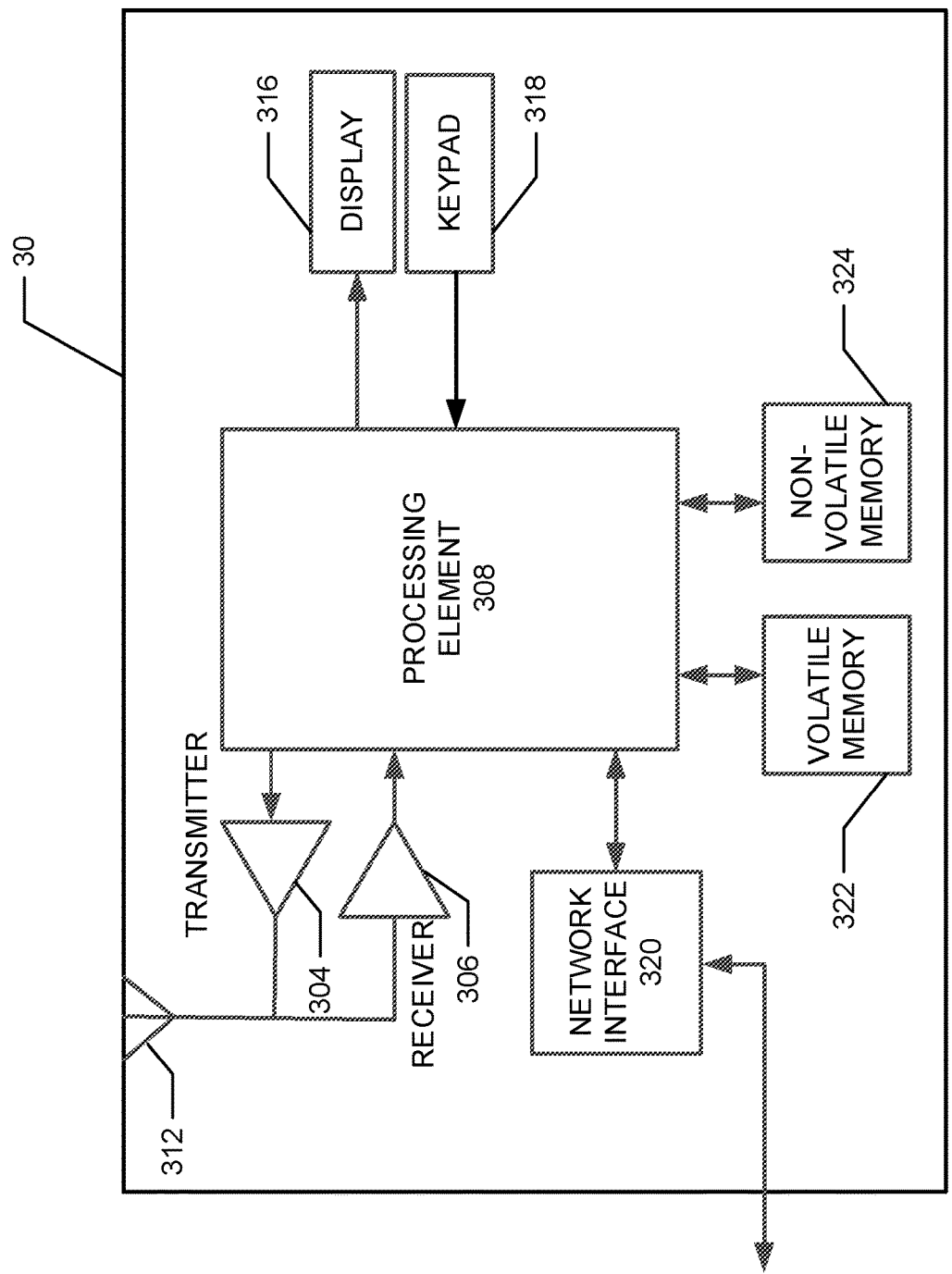

METHOD, APPARATUS AND COMPUTER PROGRAM PRODUCT FOR IMPROVING DEEP QUESTION-ANSWERING (QA) APPLICATIONS USING FEEDBACK FROM RETRIEVAL QA APPLICATIONS

TECHNOLOGICAL FIELD

Embodiments of the present invention generally relate to machine-learning based methodologies for automatic question-answering (QA). More specifically, various embodiments of the present invention include both a deep learning based QA (deep QA) application and a retrieval based QA (retrieval QA). In various embodiments, the deep QA application can be improved based on feedback from the retrieval QA application.

BACKGROUND

As recognized, a common technical challenge in computer-implemented automatic question-answering (QA) is generating accurate answers to complex questions posed in natural language form. The causes of this technical challenge can stem from a variety of reasons. For example, some QA systems/platforms/applications rely on formulating a search query based on the question. However, such methodologies have a variety of shortcomings. For example, when the question is very complex, these QA systems/platforms/applications are unable to properly formulate a search query. Some QA systems/platforms/applications rely on machine learning, yet these QA systems/platforms/applications often lack proper training.

These technical challenges also have business implications. For example, there is a need for QA automation in consumer support. For instance, when a QA system fails to return a relevant answer to a question asked by a consumer, the consumer may request to talk to a human agent over the phone, thus increasing the operating cost of the company.

Accordingly, there is a latent need for a rigorous methodology for a QA system that generates accurate answers to complex questions posed in natural language form, and automatically improves the accuracy in generating answers over time. Through applied effort, ingenuity, and innovation, the inventors have developed systems and methods that produce such QA systems/platforms/applications. Some examples of these solutions are described in detail herein.

BRIEF SUMMARY

In general, embodiments of the present invention provide methods, apparatus, systems, computing devices, computing entities, and/or the like.

In accordance with one aspect, a computer-implemented method is provided. In one embodiment, the method comprises receiving, by one or more processors, an input question originating from a user computing entity; generating, by the one or more processors, a first answer and a first confidence score using a deep question-answering (QA) application, the first answer being in response to the input question and the deep QA application comprising a neural network; determining, by the one or more processors, whether the first confidence score satisfies a first configurable threshold; in response to determining that the first configurable threshold does not satisfy the first configurable threshold, generating, by the one or more processors, a second answer using a retrieval QA application, the second answer being in response to the input question; determining, by the one or more processors, a second confidence score associated with the second answer; and determining, by the one or more processors, whether the second confidence score satisfies a second configurable threshold.

In accordance with another aspect, a computer program product is provided. The computer program product may comprise at least one computer-readable storage medium having computer-readable program code portions stored therein, the computer-readable program code portions comprising executable portions configured to receive an input question originating from a user computing entity; generate a first answer and a first confidence score using a deep question-answering (QA) application, the first answer being in response to the input question and the deep QA application comprising a neural network; determine whether the first confidence score satisfies a first configurable threshold; in response to determining that the first confidence score does not satisfy the first configurable threshold, generating, by the one or more processors, a second answer using a retrieval QA application, the second answer being in response to the input question; determine a second confidence score associated with the second answer; and determine whether the second confidence score satisfies a second configurable threshold.

In accordance with yet another aspect, a computing system comprising at least one processor and at least one memory including computer program code is provided. In one embodiment, the at least one memory and the computer program code may be configured to, with the processor, cause the apparatus to receive an input question originating from a user computing entity; generate a first answer and a first confidence score using a deep question-answering (QA) application, the first answer being in response to the input question and the deep QA application comprising a neural network; determine whether the first confidence score satisfies a first configurable threshold; in response to determining that the first confidence score does not satisfy the first configurable threshold, generating, by the one or more processors, a second answer using a retrieval QA application, the second answer being in response to the input question; determine a second confidence score associated with the second answer; and determine whether the second confidence score satisfies a second configurable threshold.

The above summary is provided merely for purposes of summarizing some example embodiments to provide a basic understanding of some aspects of the invention. Accordingly, it will be appreciated that the above-described embodiments are merely examples. It will be appreciated that the scope of the invention encompasses many potential embodiments in addition to those here summarized, some of which will be further described below.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 is a schematic representation of a user computing entity in accordance with various embodiments of the present invention;

DETAILED DESCRIPTION OF SOME EXAMPLE EMBODIMENTS

Figure 1:
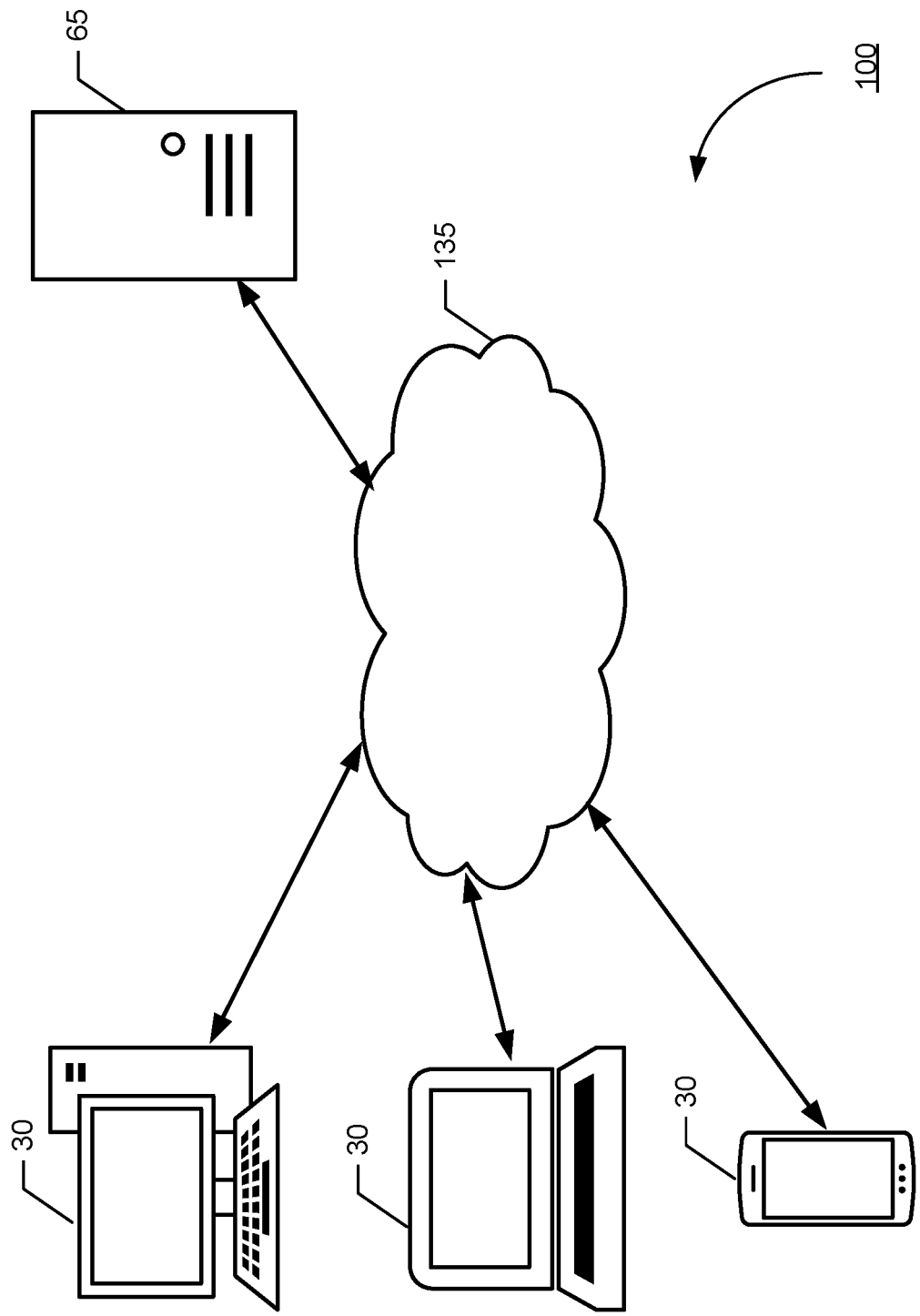
FIG. 1 is a diagram of a hybrid question-answering (hybrid QA) platform/system that can be used in accordance with various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

The phrases "in one embodiment," "according to one embodiment," and/or the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

I. COMPUTER PROGRAM PRODUCTS, METHODS, AND COMPUTING ENTITIES

Embodiments of the present invention may be implemented as computer program products that comprise articles of manufacture. Such computer program products may include one or more software components including, for example, applications, software objects, methods, data structures, and/or the like. A software component may be coded in any of a variety of programming languages. An illustrative programming language may be a lower-level programming language such as an assembly language associated with a particular hardware architecture and/or operating system platform/system. A software component comprising assembly language instructions may require conversion into executable machine code by an assembler prior to execution by the hardware architecture and/or platform/system. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Embodiments of the present invention may also be implemented as a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media may include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of a hybrid question-answering (hybrid QA) platform/system 100 that can be used in conjunction with various embodiments of the present invention. As shown in FIG. 1, the hybrid QA platform/system 100 may comprise one or more QA computing entities 65, one or more user computing entities 30, and one or more networks 135. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities, the various embodiments are not limited to this particular architecture.

a. Exemplary QA Computing Entity

Figure 2A:
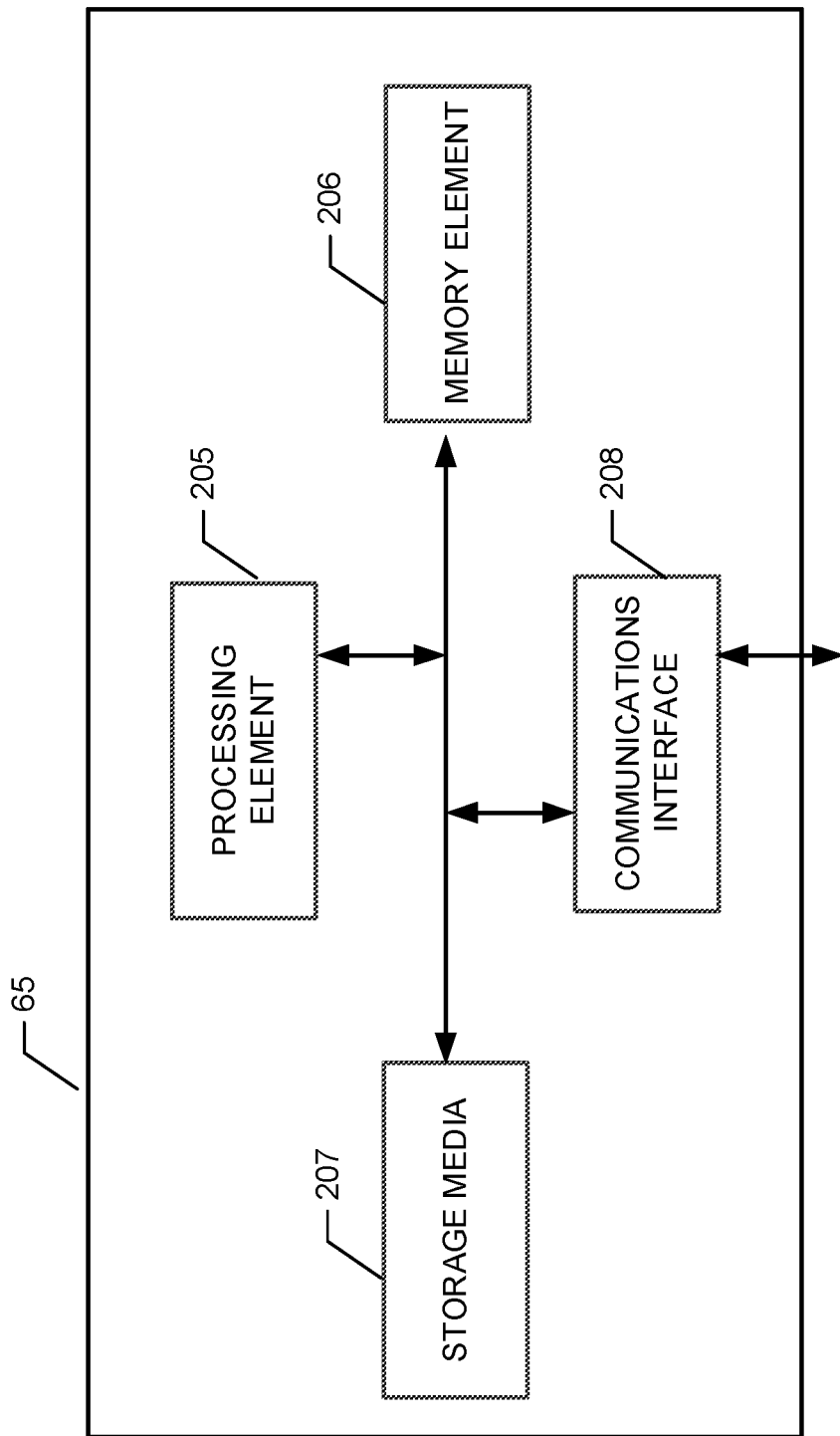
FIG. 2A is a schematic representation of a QA computing entity in accordance with various embodiments of the present invention.

FIG. 2A provides a schematic of a QA computing entity 65 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

As indicated, in one embodiment, the QA computing entity 65 may also include one or more network and/or communications interfaces 208 for communicating with various computing entities, such as by communicating data, content, information, and/or similar terms used herein that can be transmitted, received, operated on, processed, displayed, stored, and/or the like. For instance, the QA computing entity 65 may communicate with other QA computing entities 65, one or more user computing entities 30, and/or the like.

As shown in FIG. 2A, in one embodiment, the QA computing entity 65 may include or be in communication with one or more processing elements 205 (also referred to as processors, processing circuitry, and/or similar terms used herein interchangeably) that communicate with other elements within the QA computing entity 65 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the QA computing entity 65 may further include or be in communication with volatile media (also referred to as volatile storage, memory, memory storage, memory circuitry and/or similar terms used herein interchangeably). In one embodiment, the volatile storage or memory may also include one or more memory element 206 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory element 206 may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the QA computing entity 65 with the assistance of the processing element 205 and operating system.

Figure 2B:
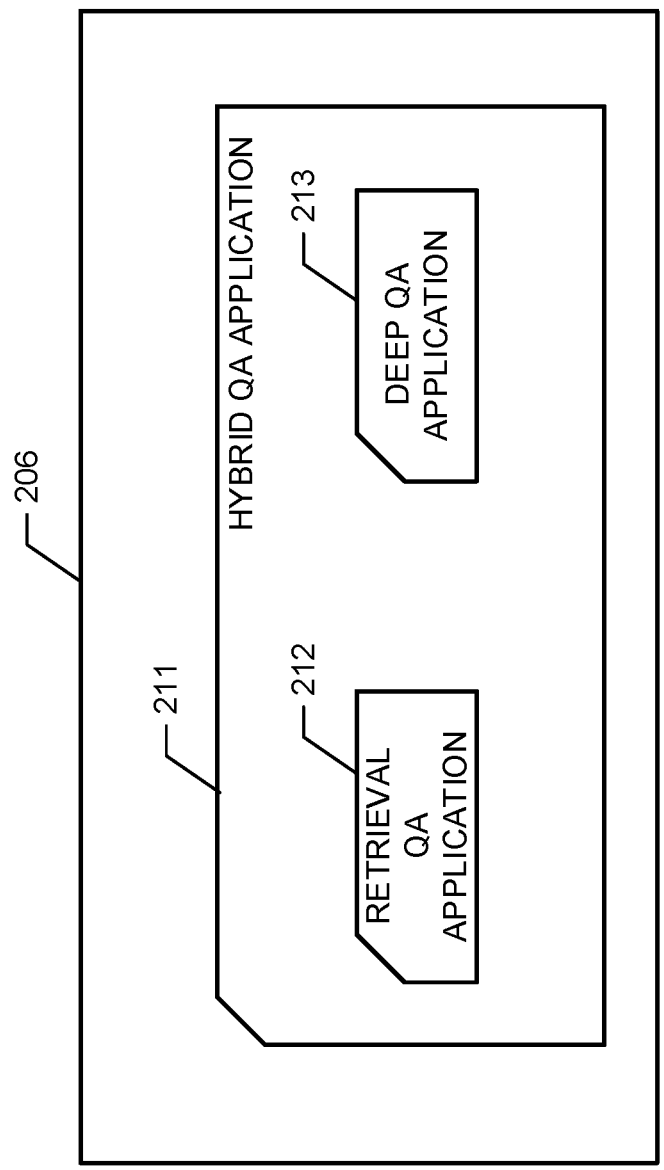
FIG. 2B is a schematic representation of a memory element storing a plurality of applications, programs, scripts, and/or source code in accordance with various embodiments of the present invention.

As illustrated in FIG. 2B, the data stored in the memory element 206 may comprise computer programming applications such as the hybrid QA application 211, which comprises the retrieval QA application 212 and the deep QA application 213 (e.g., deep QA model 213). Details of the retrieval QA application 212 are described further in connection with FIGS. 4 and 7-9 below. Details of the deep QA application 213 are described further in connection with FIGS. 5-9 below. Details of the hybrid QA application 211 are described further in connection with FIGS. 4-9 below.

In one embodiment, the QA computing entity 65 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or storage media 207 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or storage media 207 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Storage media 207 may also be embodied as a data storage device or devices, as a separate database server or servers, or as a combination of data storage devices and separate database servers. Further, in some embodiments, storage media 207 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the information/data required for the operation of the recovery prediction system may be stored. Further, the information/data required for the operation of the recovery prediction system may also be partially stored in the cloud data storage system and partially stored in a locally maintained data storage system.

More specifically, storage media 207 may encompass one or more data stores configured to store information/data usable in certain embodiments. For example, as shown in FIG. 2C, data stores encompassed within the storage media 207 may comprise document collection 214 and training data 215.

Figure 2C:
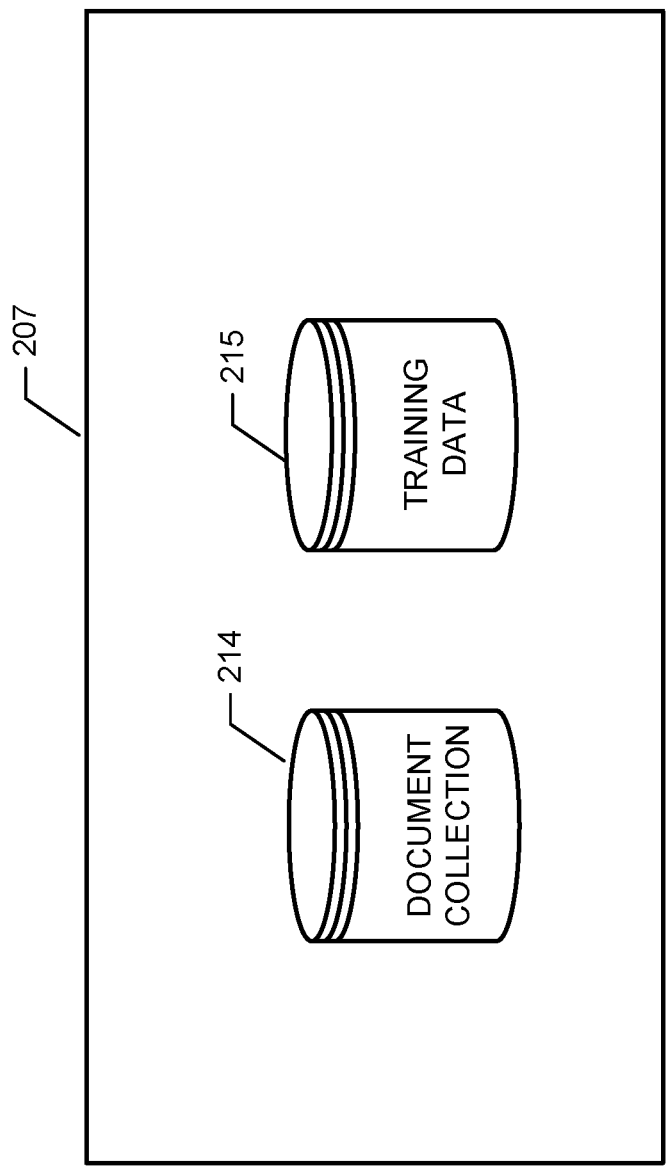
FIG. 2C is a schematic representation of a storage media storing a plurality of repositories, databases, and/or relational tables in accordance with various embodiments of the present invention.

Continuing with FIG. 2C, document collection 214 comprises data/information supporting the retrieval QA application 212 to generate an answer in response to a question. For example, if the hybrid QA platform/system 100 is implemented by a healthcare organization, the document collection 214 may include provider information/data indicative of various healthcare providers, such as provider identifiers, provider locations, and/or the like. The document collection 214 may also include member information/data indicative of the identity of members, such as their name, date of birth, date of death, and other identifying information/data. The document collection 214 may also include resource information/data indicative of company resources, such as definitions of terms, benefit plans, and/or the like. The document collection 214 may also include procedure information/data indicative of company procedures. For example, procedure information/data may include information regarding how a member can check his health savings account balance, how to submit a medical claim, and/or the like. Details of how the retrieval QA application 212 generates an answer in response to a question based on the data/information stored in the document collection 214 are described further below with reference to FIG. 4.

Continuing with FIG. 2C, the training data 215 may comprise data for training the deep QA application 213 (e.g., deep QA model 213) (e.g., deep machine learning QA application or a neural network QA application). For example, the training data 215 may comprise question-answer (QA) pairs. Each QA pair includes a question ("Q") and a corresponding correct answer ("A"). As described in further detail, the hybrid QA application 211 adjusts or "trains" the deep QA application 213 (e.g., deep QA model 213) using the training data 215 to improve the accuracy of answers generated by the deep QA application 213 (e.g., deep QA model 213). The hybrid QA application 211 may generate the training data using feedback from the retrieval QA application 212, details of which are described in connection with FIGS. 7-9.

As described above, in one embodiment, the retrieval QA application 212 and the deep QA application 213 (e.g., deep QA model 213) are stored in the memory elements 206. In an alternative embodiment, both the retrieval QA application 212 and the deep QA application 213 (e.g., deep QA model 213) are stored in the storage media 207. In this embodiment, when the processing element 205 executes code of the retrieval QA application 212 and/or the deep QA application 213 (e.g., deep QA model 213) to perform operations in accordance with the present invention, the retrieval QA application 212 and/or the deep QA application 213 (e.g., deep QA model 213) are loaded by the processing element 205 to the memory element 206.

As described above, in one embodiment, the document collection 214 and the training data 215 are stored in the storage media 207. In an alternative embodiment, the document collection 214 and/or the training data 215 may be wholly or partially stored in the memory element 206. For example, when the retrieval QA application 212 retrieves documents from the document collection 214 (which will be described further in connection with FIG. 4), the document collection 214 may be partially stored in the memory element 206 (e.g. cache) to facilitate the operations in accordance with the present invention.

As indicated, in one embodiment, the QA computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the QA computing entity 65 may communicate with computing entities or communication interfaces of other QA computing entities 65, user computing entities 30, and/or the like.

As indicated, in one embodiment, the QA computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the QA computing entity 65 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The QA computing entity 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the QA computing entity's components may be located remotely from other QA computing entity 65 components, such as in a distributed system. Furthermore, one or more of the components may be aggregated and additional components performing functions described herein may be included in the QA computing entity 65. Thus, the QA computing entity 65 can be adapted to accommodate a variety of needs and circumstances.

b. Exemplary User Computing Entity

FIG. 3 provides an illustrative schematic representative of one of the user computing entities 30 that can be used in conjunction with embodiments of the present invention. As will be recognized, the user computing entity may be operated by an agent and include components and features similar to those described in conjunction with the QA computing entity 65. Further, as shown in FIG. 3, the user computing entity may include additional components and features. For example, the user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a QA computing entity 65, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using Unstructured Supplementary Service data (USSD), Short Message Service (SMS), Multimedia Messaging Service (MMS), Dual-Tone Multi-Frequency Signaling (DTMF), Subscriber Identity Module Dialer (SIM dialer), and/or the like. The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user output interface may be updated dynamically from communication with the QA computing entity 65. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Networks

In one embodiment, the networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms/systems provided by network providers or other entities.

Further, the networks 135 may utilize a variety of networking protocols including, but not limited to, TCP/IP based networking protocols. In some embodiments, the protocol is a custom protocol of JSON objects sent via a Websocket channel. In some embodiments, the protocol is JSON over RPC, JSON over REST/HTTP, and/or the like.

III. EXEMPLARY SYSTEM OPERATION

Reference will now be made to FIGS. 4-9, which provide flowcharts and diagrams of operations and/or processes for carrying out embodiments of the present invention.

a. Brief Overview

As indicated, there is a latent need for a rigorous methodology for a hybrid QA application that generates accurate answers to complex questions posed in natural language form, and automatically improves the accuracy in generating these answers.

1. Technical Problem

Automatic question-answering (QA) is a subfield of natural language processing. One of the goals of QA is to automatically generate answers for questions posed in natural language form. As such, QA is a very important component of any conversational artificial intelligence (AI) system.

However, QA systems/platforms/applications are faced with many technical problems and challenges. For example, a retrieval-based QA system may reformulate a question as a query, and then retrieve an ordered collection of document/passages (e.g., search results) from an information retrieval system based on the query. Each search result is then parsed to find relevant answers for the question. As such, technical disadvantages of a retrieval-based QA system include its heavy reliance on the question being properly formulated and formatted and its dependencies on the search engine to retrieve relevant results.

As another example, a deep QA system is an end-to-end machine learning model for question answering based on deep learning models (e.g., neural networks). Deep QA systems/platforms/applications generate answers from sets of documents in response to input questions. One of the technical disadvantages of deep QA systems/platforms/applications is that they are "data hungry" and require large volumes of data for training the deep learning models, which can be difficult to extract.

2. Technical Solution

To overcome at least the above-identified technical challenges, various embodiments of the present invention include a hybrid QA application 211 that feeds the output of a retrieval QA application 212 into a deep QA application. In particular, various embodiments of the present invention provide a hybrid QA application 211 that comprises a retrieval QA application 212 and a deep QA application, and is capable of generating accurate answers to simple and complex questions posed in natural language form. Further, the hybrid QA application 211 feeds answers generated by the retrieval QA application 212 to the deep QA application 213 as training data, such that the deep QA application 213 can be improved over time to provide accurate answers to questions. In some embodiments, only answers that satisfy a confidence threshold are fed into the deep QA application 213 as training data, hence providing quality control on training the deep QA application. As a result, the hybrid QA application 211 in accordance with various embodiments of the present invention provides better, more accurate answers than existing QA systems/platforms/applications. Details of the technical solutions in accordance with embodiments of the present invention are described further below.

b. Retrieval Question Answering (QA) Applications

In various embodiments of the present invention, the hybrid QA application 211 may comprise one or more retrieval QA applications 212. For example, as shown in FIG. 2B, the memory element 206 of a QA computing entity 65 of the hybrid QA platform/system 100 may comprises a retrieval QA application 212. The retrieval QA application 212 generates an answer in response to a question based on retrieving information from one or more document collection(s), such as document collection 214 stored in the storage media 207 of the QA computing entity 65. Example operations of a retrieval QA application 212 are shown in FIG. 4.

Figure 4:
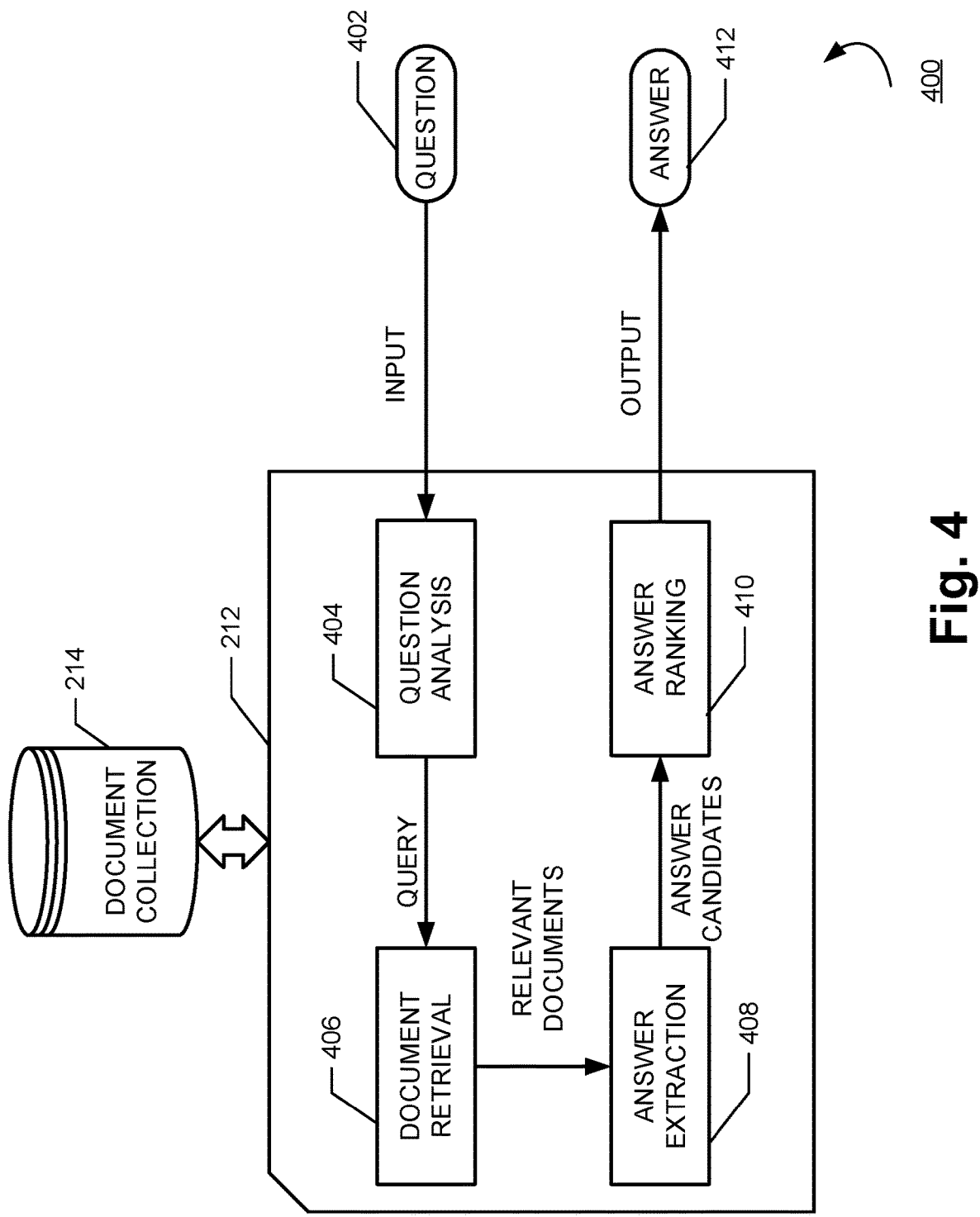
FIG. 4 is a flowchart illustrating an example method of a retrieval question-answering (QA) application generating an answer in response to an input question, in accordance with various embodiments of the present invention.

Referring now to FIG. 4, an example method 400 illustrates operation of a retrieval QA application 212 in accordance with embodiments of the present invention. At step/operation 402, the QA computing entity 65 includes means, such as the communications interface 208, for receiving a question as an input to the retrieval QA application 212. For example, a user may input (e.g., voice, text, and/or the like) a question through one of the user computing entities 30, and the QA computing entity 65 may receive the question via the networks 135.

In various embodiments, the question may be posed in natural language form. "Natural language" refers to a language that has developed naturally in use by humans, in contrast to computer code. In other words, the question posed in natural language form is a conversional input by a human. As an example, the following question may be the input to the retrieval QA application 212:

What is the pharmacy deductible?

Referring back to FIG. 4, the QA computing entity 65 includes means, such as the processing element 205 and the memory element 206, for conducting question analysis at step/operation 404. For example, the retrieval QA application 212 may comprise computer program instructions that, when executed by one or more processing elements 205, cause the QA computing entity 65 to analyze the input question to formulate a query. The term "query" (or "document retrieval query," "search query") refers to a data/information retrieval request to a search engine or information retrieval system, such as the document collection 214 stored in the storage media 207.

For example, the retrieval QA application 212 may comprise computer program instructions that, when executed by one or more processing elements 205, cause the QA computing entity 65 to "tokenize" the input question. Tokenizing of the question demarcates and classifies sections of the question. In other words, tokenization breaks down the question into smaller pieces of information called tokens. Each token is an instance of a sequence of characters that are grouped together as a useful semantic unit for processing. Continuing from the example above, the QA computing entity 65 may tokenize the input question may be tokenized as follows:

What; is; the; pharmacy; deductible;?

In the above example, each token is separated by a semicolon.

After the question is tokenized, the retrieval QA application 212 may comprise computer program instructions that, when executed by one or more processing elements 205, cause the QA computing entity 65 to remove "stop words" from the tokens. "Stop words" are common words in a language that provide little value in formulating a search query. In one embodiment of the present invention, the QA computing entity 65 may include a "stop list" stored in a data storage media, such as the memory element 206 or the storage media 207. The stop list includes all words that the QA computing entity 65 determines to be a "stop word," such as "the," "is," and/or the like. To remove "stop words" from the tokens, the retrieval QA application 212 may comprise computer program instructions that, when executed by one or more processing elements 205, cause the QA computing entity 65 to determine whether a token matches any words from the "stop list." If so, then the QA computing entity 65 removes the token. Continuing from the previous example, the QA computing entity 65 may removes the tokens "what," "is," and "the," resulting in the remaining tokens as follows:

pharmacy; deductible;

After the "stop words" are removed from the tokens, the retrieval QA application 212 may comprise computer program instructions that, when executed by one or more processing elements 205, cause the QA computing entity 65 to formulate a search query. In some embodiments, the QA computing entity 65 may stem the tokens. The goal of stemming is to adjust any token in a derivational form to a common base form. For example, the QA computing entity 65 may change "medications" to "medication." Subsequent to stemming the tokens, the retrieval QA application 212 may formulate a search query. Continuing from the above example, the QA computing entity 65 may generate a search query "pharmacy deductible" based on the input question "What is the pharmacy deductible?".

Referring back to FIG. 4, after the question analysis is conducted and the query is formulated, the QA computing entity 65 includes means, such as one or more processing elements 205, the memory element 206, and the storage media 207, for conducting document retrieval at step/operation 406. For example, the retrieval QA application 212 may comprise computer program instructions that, when executed by one or more processing elements 205, cause the QA computing entity 65 to search the document collection 214 stored in the storage media 207 based on the query generated at step/operation 404. In some embodiments, the QA computing entity 65 may conduct the search using ElasticSearch, which is an open source search engine by APACHE®. After the searching the document collection 214, the QA computing entity 65 identifies one or more relevant document(s) associated with the query.

In some embodiments, the QA computing entity 65 may build the document collection 214 based on existing data and documents in the hybrid QA platform/system 100. For example, if the hybrid QA platform/system 100 is implemented in a healthcare organization, the document collection 214 may include information such as benefit documents, frequently-asked-questions (FAQ) documents, chat logs between agents of the healthcare organization and customer, and/or the like. The document collection 214 provides a knowledge base for the retrieval QA application 212 to retrieve information in response to the input question.

Referring back to FIG. 4, after relevant document(s) are identified, the QA computing entity 65 includes means, such as one or more processing elements 205, the memory element 206, and the storage media 207, for conducting answer extraction at step/operation 408. For example, the retrieval QA application 212 may comprise computer program instructions that, when executed by one or more processing elements 205, cause the QA computing entity 65 to process relevant document(s) identified at step/operation 406 and generate an answer based on the relevant document(s).

For example, the QA computing entity 65 may rank the relevant documents based on its relevance to the search query, and identify one or more portions from the top ranked documents to create an answer. Continuing from the above example, the QA computing entity 65 may rank a document entitled "Pharmacy Benefits" as the top-ranked relevant document for the search query "pharmacy deductible." The QA computing entity 65 may then create an answer based on the "Helpful Terms to Know" section in the "Pharmacy Benefits" document.

Referring back to FIG. 4, after one or more answers are extracted, the QA computing entity 65 includes means, such as one or more processing elements 205, the memory element 206, and the storage media 207, for conducting answer ranking at step/operation 410. For example, the retrieval QA application 212 may comprise computer program instructions that, when executed by one or more processing elements 205, cause the QA computing entity 65 to rank the answers.

For example, the QA computing entity 65 may calculate a relevance score indicating how relevant each answer is to the question. The QA computing entity 65 may also determine whether the type of the answer (for example, a "yes") matches the type of the question (for example, a yes/no question). The QA computing entity 65 may rank the one or more answers exacted at step/operation 410 based on the above-mentioned calculations, determinations, and/or the like.

In some embodiments of the present invention, the QA computing entity 65 may calculate a relevance score using word overlap, frequency, and/or other techniques. For example, the retrieval QA application 212 may determine the relevance of an answer to a question based on whether there is any overlap between words in the answer and in the question. The retrieval QA application 212 may further determine the relevance based on the frequency of certain keywords in the generated answer and their relevancy to the question.

In some embodiments of the present invention, the QA computing entity 65 may calculate a relevance score using one or more machine learning models. For example, the retrieval QA application 212 may implement one or more machine learning models, which may be used to determine a score indicating how relevant the generated answer is to the question.

Referring back to FIG. 4, after answers are extracted, the QA computing entity 65 includes means, such as one or more processing elements 205 and the communications interfaces 208, for outputting answers at step/operation 412. For example, the QA computing entity 65 may transmit the answers via the networks 135 to the one or more user computing entities 30 as shown in FIG. 1. In various embodiments of the present invention, the output answer is the top ranked answer at step/operation 410.

As described above, in some embodiments of the present invention, the retrieval QA application 212 does not require training (in contrast to the deep QA application 213 described below). Further, the retrieval QA application 212 may generate an answer to a question with little or no latency. However, the retrieval QA application 212 has several technical disadvantages. As described above, the retrieval QA application 212 is pipeline-based, where errors can propagate. For example, if the retrieval QA application 212 conducted question analysis incorrectly, the resultant answers can be irrelevant to the question. Further, the quality of the answer depends on proper query formulation and search engine retrieval, and retrieval QA application 212 does not work well for complicated questions.

c. Deep Question-Answering (QA) Applications

In various embodiments of the present invention, the hybrid QA application 211 may comprise one or more deep QA applications 213. For example, as shown in FIG. 2B, the memory element 206 of a QA computing entity 65 of the hybrid QA platform/system 100 may comprise a deep QA application 213 (e.g., deep QA model 213). The deep QA application 213 generates an answer in response to a question based on one or more machine learning models (e.g., deep learning models). Example operations of a deep QA application 213 are shown in FIG. 5.

Figure 5:
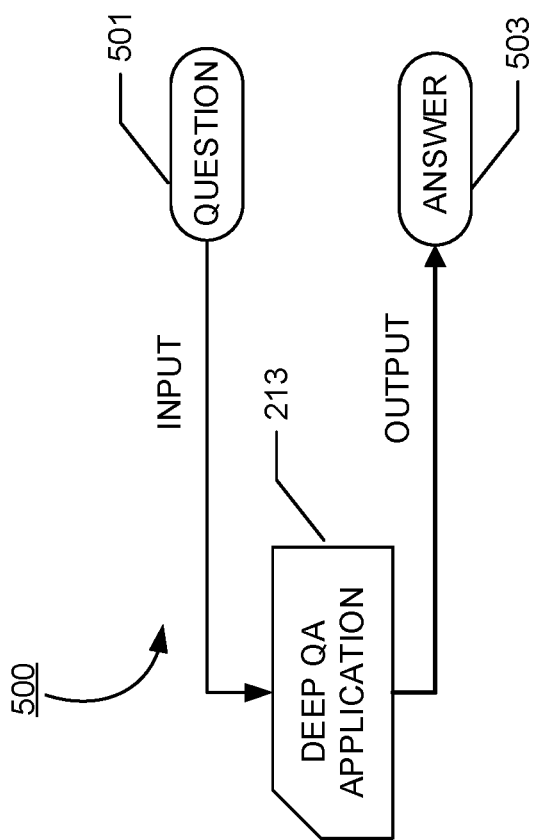
FIG. 5 is a flowchart illustrating an example method of a deep question-answering (QA) application generating an answer in response to an input question, in accordance with various embodiments of the present invention.

Referring now to FIG. 5, an example method 500 illustrates operation of a deep QA application 213 in accordance with embodiments of the present invention. At step/operation 501, the QA computing entity 65 includes means, such as the communications interface 208, for receiving a question as an input to the deep QA application 213 (e.g., deep QA model 213). For example, a user may input a question through one of the user computing entities 30 as shown in FIG. 1, and the QA computing entity 65 may receive the question via the networks 135.

In various embodiments, the question may be posed in natural language form. As an example, the following question may be the input to the deep QA application:

How can the plan member get pre-approval when the doctor won't do it?

After receiving the input question, the QA computing entity 65 includes means, such as one or more processing elements 205 and the memory element 206, for generating an answer using the deep QA application 213 (e.g., deep QA model 213). As described above, the deep QA application 213 may be based on deep learning models or neural networks. Deep learning models or neural networks enable computing entities to automatically detect and/or classify features from raw data. An example deep learning model or neural network is shown in FIG. 6.

Figure 6:
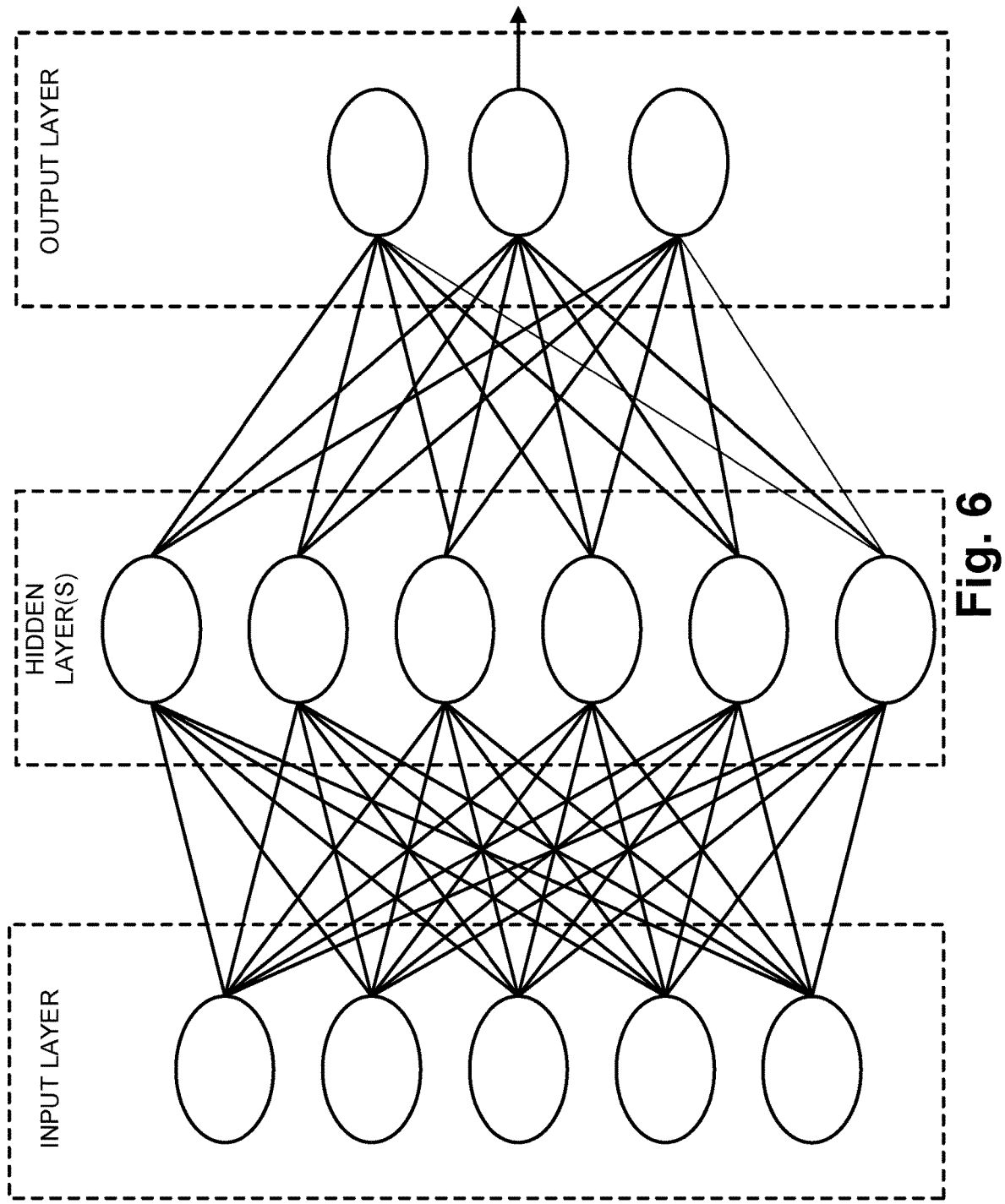
FIG. 6 is an example artificial neural network of a deep QA application in accordance with various embodiments of the present invention.

Referring now to FIG. 6, an example artificial neural network of the deep QA application 213 is shown. The example artificial neural network includes an interconnected group of nodes. Each node represents a mathematical function. The input to the mathematical function may include a set of input values and associated weights, and the mathematical function may map the inputs and weights to an output. The arrows connecting the nodes represent connections from the output of one node to the input of another node. For purposes of illustration, FIG. 6 shows a total of fourteen nodes. It is noted, however, that FIG. 6 is not meant to limit the number of nodes in an artificial neural network.

In FIG. 6, nodes are aggregated into layers. In this regard, different layers may perform different transformations of their corresponding inputs. As shown in FIG. 6, the example artificial neural network includes at least three layers: an input layer, one or more hidden layer(s), and an output layer. For purposes of illustration, FIG. 6 shows one hidden layer. It is noted, however, that FIG. 6 is not meant to limit the number of hidden layers in an artificial neural network.

In an example, each of the nodes in the input layer is generated based on tokenization of the input question. Continuing from the above example, tokens of the input question include:

How; can; the; plan; member; get; pre-approval; when; the; doctor; won't; do; it;?

In the above example, each token is separated by a semicolon.

The artificial neural network may then "embed" or map each token into a vector with real numbers. For example, the artificial neural network may map the word "plan" as follow:

W("plan")=(0.4, 0.8, −0.6, . . . )

In some embodiments, the mapping is conducted based on one or more lookup tables (for example, a matrix) that identify the numbers for each word.

Through embedding and conducting calculations in the one or more hidden layers, the artificial neural network determines the meaning and context of the question. The artificial neural network then calculates the probabilities (e.g., confidence scores) of which answer is likely to be the correct answer to the question. The artificial neural network further selects answer that has the highest probability (e.g., confidence score).

In the above mentioned example, the simple baseline model of deep learning is used. It is noted, however, that other types of deep learning models may be used in accordance with various embodiments of the present invention.

Referring back to FIG. 5, after an answer is generated, the QA computing entity 65 includes means, such as one or more processing elements 205 and the communications interfaces 208, for outputting an answer at step/operation 503. For example, the QA computing entity 65 may transmit the answer via the networks 135 to the one or more user computing entities 30 as shown in FIG. 1.

As illustrated above, deep QA application 213 provides an approach to question-answering by having an end-to-end model where the question is the input and the answer and corresponding score generated based on machine learning is the output. One technical advantage of the deep QA application 213 is that its machine learning model that can always be improved by adding more labeled data for training. In other words, the deep QA application 213 learns to improve its accuracy by examining example input question-answer (QA) pairs, and building a model that returns answers for similar questions in the example input QA pairs by adjusting the weights of different nodes in the network (details are further described below in connection with FIG. 7). Through training, the deep QA application 213 can generate accurate answers to complex questions.

One technical disadvantage of the deep QA application 213 is that it requires training. When the input question is not similar to any question in the training data, the deep QA application 213 may behave poorly and fail generate an accurate answer to the question. As described further in details below, various embodiments of the present invention overcome these technical disadvantages by generating training data for the deep QA based on feedback from a retrieval QA application, so as to continuously improve the deep QA application.

d. Hybrid Question-Answering (QA) Applications

As described above, deep QA applications 213 require training data to generate accurate answers in response to input questions. However, if no training data exists, it would be computational impracticable to generate training data from scratch.

Figure 8:
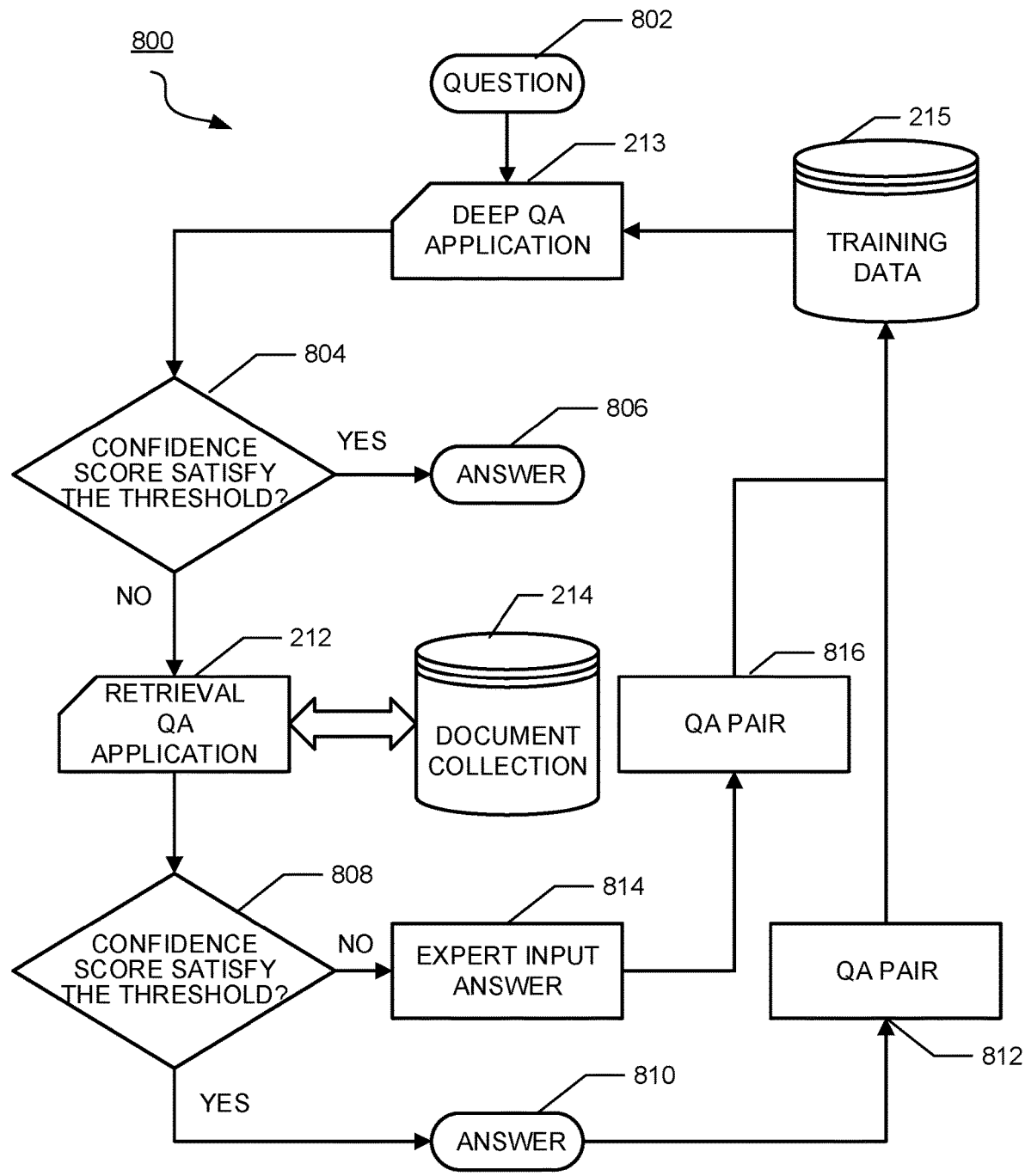
Figure 9:
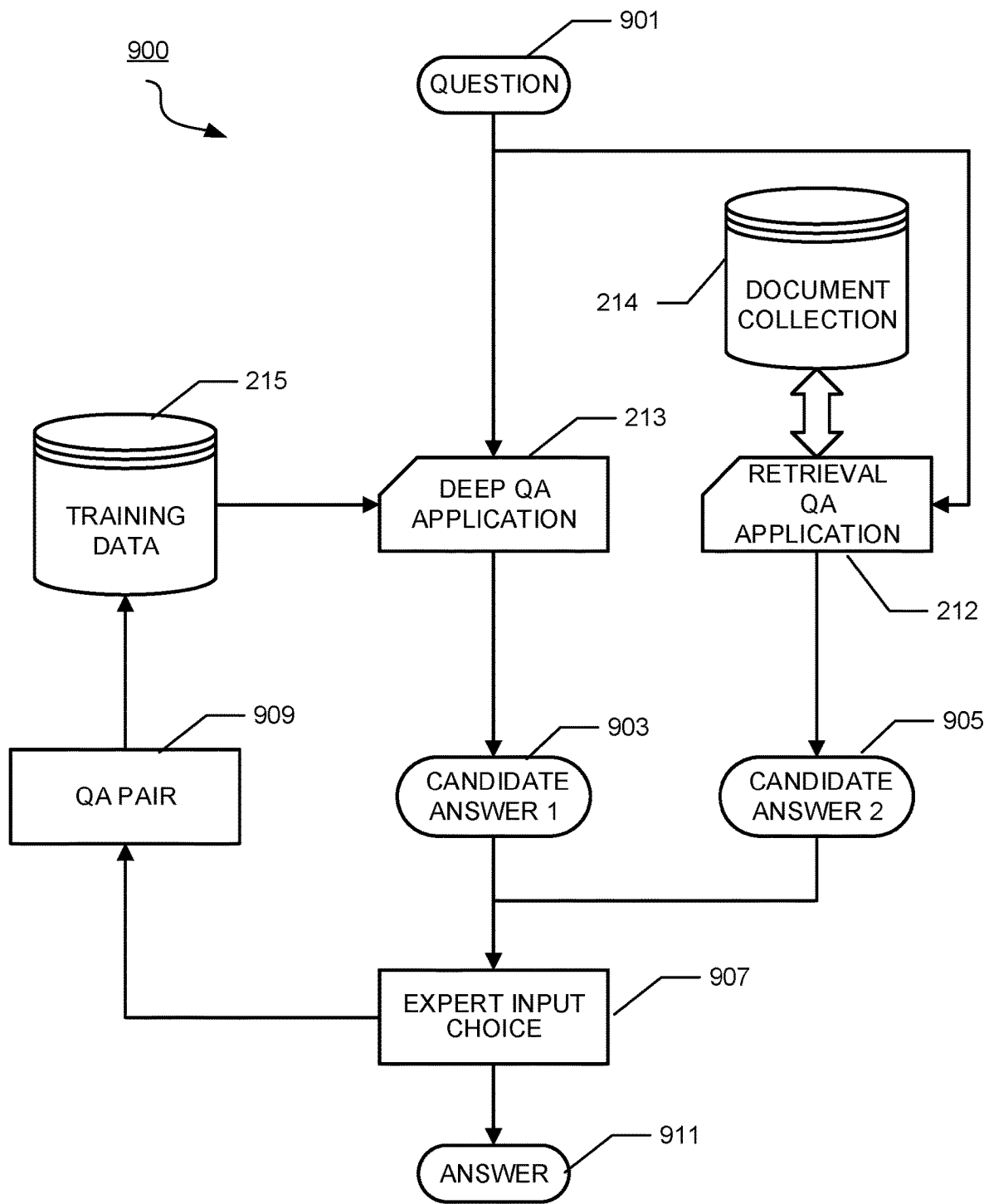

Various embodiments of the present invention solve these technical challenges by developing a hybrid QA application 211 that comprises one or more deep QA applications 213 and/or one or more retrieval QA applications 212. The hybrid QA application 211 further trains the one or more deep QA applications 213 based on feedback from the one or more retrieval QA applications 212 and/or user input. Example operations of the hybrid QA application 211 in accordance with various embodiments are shown in FIGS. 7-9.

Figure 7:
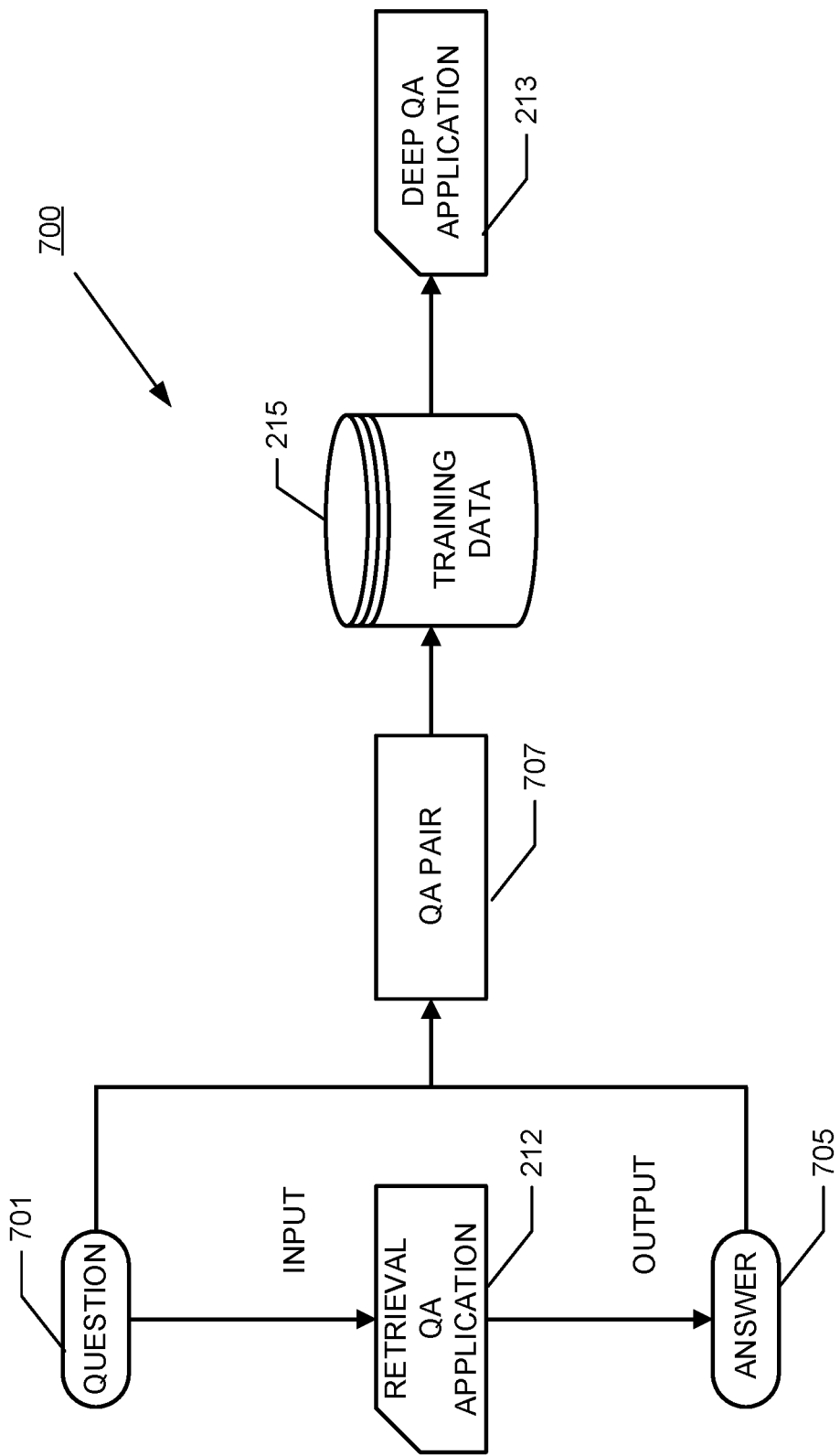
FIGS. 7, 8, and 9 are flowcharts for example operations, steps, and processes in accordance with various embodiments of the present invention.

Referring now to FIG. 7, an example method 700 illustrates operation of training the deep QA application 213 of the hybrid QA application 211 based on feedback from the retrieval QA application 212 in accordance with embodiments of the present invention. At step/operation 701, the QA computing entity 65 includes means, such as the communications interface 208, for receiving a question as an input to the retrieval QA application 212. For example, a user may input a question through one of the user computing entities 30 as shown in FIG. 1, and the QA computing entity 65 may receive the question via the networks 135. The question may be posed in natural language form. For example, the following question may be the input to the retrieval QA application 212:

What is the pharmacy deductible?

The QA computing entity 65 includes means, such as one or more processing elements 205 and the memory element 206, for generating an answer to the question using a retrieval QA application 212. For example, the hybrid QA application 211 may comprise computer program instructions that, when executed by one or more processing elements 205, cause the QA computing entity 65 to generate an answer by the retrieval QA application 212. The retrieval QA application 212 may generate an answer to the question based on various embodiments of the present disclosure, including, for example, as described in connection with FIG. 4.

After the answer is generated, the QA computing entity 65 includes means, such as one or more processing elements 205 and the communications interfaces 208, for outputting the answer at step/operation 705. For example, the QA computing entity 65 may transmit the answer via the networks 135 to the one or more user computing entities 30 as shown in FIG. 1.

Continuing from the previous example, the retrieval QA application 212 may generate the following answer:

A pharmacy deductible is a fixed amount that you need to pay for prescribed medications before the health plan starts to make payments for covered prescriptions.

Referring back to FIG. 7, the QA computing entity 65 includes means, such as one or more processing elements 205 and the memory element 206, for generating a QA pair at step/operation 707. For example, the hybrid QA application 211 may comprise computer program instructions that, when executed by one or more processing elements 205, cause the QA computing entity 65 to generate a question-answer (QA) pair based on the question received at step/operation 701 and the answer generated by the retrieval QA application 212 at step/operation 705. Continuing from the example above, the QA computing entity 65 may generate the follow QA pair with a probability or confidence score of 89:

Q: What is the pharmacy deductible?
A: A pharmacy deductible is a fixed amount that you need to pay for prescribed medications before the health plan starts to make payments for covered prescriptions.

After the QA pair is generated, the QA computing entity 65 includes means, such as one or more processing elements 205, the memory element 206, and the storage media 207, for storing the QA pair to the training data 215. The QA computing entity 65 uses the training data 215 to improve the accuracy of answers generated by the deep QA application 213 (e.g., deep QA model 213) of the hybrid QA application 211.

As indicated, "training" the deep QA application 213 (e.g., deep QA model 213) refers to the process that adjusts the mathematical functions of the deep QA application 213 (e.g., deep QA model 213) based on an example input and its desired output. As described above, each node in the artificial neural network may represent a mathematical function, and the input to the mathematical function may include a set of input values and associated weights. When training the deep QA application 213 (e.g., deep QA model 213), QA pairs (e.g., training data 215) are provided to the deep QA application 213 (e.g., deep QA model 213). The deep QA application 213 (e.g., deep QA model 213) may generate an answer based on the Question in the QA pair, and compare the answer to the Answer in the QA pair (e.g., the desired answer). Based on the comparison, the deep QA application 213 (e.g., deep QA model 213) may then adjust the mathematical functions (for example, the weights) of nodes in hidden layer(s) in the artificial neural network. By doing so, the deep QA application 213 (e.g., deep QA model 213) is able to provide the desired answer to a question similar to the question in the QA pair.

Continuing from the above example, the QA computing entity 65 may use the QA pair regarding "pharmacy deductible" to train the deep QA application 213 (e.g., deep QA model 213). When the deep QA application 213 (e.g., deep QA model 213) receives an input question similar to "what is the pharmacy deductible?", the deep QA application 213 (e.g., deep QA model 213) is able to output the correct answer as it has been trained using the training data 215.

Referring now to FIG. 8, an example method 800 illustrates operations of the hybrid QA application 211 in the hybrid QA platform/system 100 in accordance with various embodiments of the present invention.

At step/operation 802, the QA computing entity 65 includes means, such as the communications interface 208, for receiving a question as an input to the hybrid QA application 211. For example, a user may input a question through one of the user computing entities 30 as shown in FIG. 1, and the QA computing entity 65 may receive the question via the networks 135. In various embodiments, the question may be posed in natural language form.

The QA computing entity 65 includes means, such as one or more processing elements 205 and the memory element 206, for generating an answer to the question using a deep QA application 213. For example, the hybrid QA application 211 may comprise computer program instructions that, when executed by one or more processing elements 205, cause the QA computing entity 65 to generate an answer using the deep QA application 213 (e.g., deep QA model 213). The deep QA application 213 (e.g., deep QA model 213) may generate an answer to the question with a corresponding confidence score based on various embodiments of the present disclosure, including, for example, as described in connection with FIGS. 5-6.

At step/operation 804, the QA computing entity 65 includes means, such as one or more processing elements 205 and the memory element 206, for determining whether the score generated by the deep QA application 213 satisfies a threshold (e.g., a score above a certain numerical threshold). As noted, a deep QA confidence score indicates the likelihood that the answer generated by the deep QA application 213 (e.g., deep QA model 213) is the correct answer. In that regard, the QA computing entity 65 may compare the deep QA confidence score with a predetermined/configurable threshold. The QA computing entity 65 may predetermine the threshold based on the system needs. For example, if the hybrid QA application 211 handles questions in a specific domain (such as healthcare), the QA computing entity 65 may set the threshold value based on the need in the corresponding domain.

If the QA computing entity 65 determines that the deep QA confidence score associated with the answer satisfies the predetermined/configurable threshold at step/operation 804, the QA computing entity 65 may output the answer at step/operation 806. For example, if the deep QA confidence score is 89 and the threshold is 75 or above, the QA computing entity 65 may transmit the question via the networks 135 to the one or more user computing entities 30 as shown in FIG. 1.

If the QA computing entity 65 determines that the deep QA confidence score associated with the answer does not satisfy the predetermined/configurable threshold at step/operation 804, the QA computing entity 65 may include means, such as one or more processing elements 205 and the memory element 206, for generating an answer to the question using a retrieval QA application. For example, the hybrid QA application 211 may comprise computer program instructions that, when executed by one or more processing elements 205, cause the QA computing entity 65 to generate an answer by the retrieval QA application 212. The retrieval QA application 212 may generate an answer to the question based on various embodiments of the present disclosure, including those described in connection with FIG. 4. For example, the retrieval QA application 212 may perform retrieval operations on the document collection 214 using search query formulated based on the question.

At step/operation 808, the QA computing entity 65 includes means, such as one or more processing elements 205 and the memory element 206, for determining whether the answer generated by the retrieval QA application 212 satisfies a threshold. For example, the hybrid QA application 211 may comprise computer program instructions that, when executed by one or more processing elements 205, cause the QA computing entity 65 to analyze the answer generated by the retrieval QA application 212 and calculate a retrieval QA confidence score associated with the answer. The retrieval QA confidence score indicates the likelihood that the answer generated by the retrieval QA application 212 is the correct answer. In some embodiments, the QA retrieval confidence score may be generated by the retrieval QA application 212.

After the QA retrieval confidence score is calculated, the QA computing entity 65 may compare the retrieval QA confidence score with another predetermined/configurable threshold. The QA computing entity 65 may predetermine the threshold based on the system needs. In some embodiments, the threshold for the deep QA confidence score associated with the answer generated by the deep QA application 213 (e.g., deep QA model 213) at step/operation 804 is the same as the threshold for the deep QA confidence score associated with the answer generated by the retrieval QA application 212 at step/operation 808. In some embodiments, these two thresholds are different.

From a technical standpoint, the predetermined/configurable threshold for the retrieval QA confidence score associated with the answer generated by the retrieval QA application 212 provides quality control for answers feeding into the deep QA application 213 (e.g., deep QA model 213) for training. The threshold allows embodiments of the present invention to overcome technical challenges of providing large amount of high quality data to train the deep QA application 213 (e.g., deep QA model 213). Details are further described in connection with steps/operations 810 and 812 of FIG. 8.

If the QA computing entity 65 determines that the retrieval QA confidence score associated with the answer satisfies the threshold at step/operation 808, the QA computing entity 65 may output the answer at step/operation 810. For example, the QA computing entity 65 may transmit the answer via the networks 135 to the one or more user computing entities 30 as shown in FIG. 1. Further, the QA computing entity 65 may generate a QA pair at step/operation 812 based on the input question at step/operation 802 and the answer generated by the retrieval QA application 212 in response to the question at step/operation 810. The QA computing entity 65 may further store the QA pair at step/operation 812 to the training data 215 (or retraining data) stored in the storage media 207.

If the QA computing entity 65 determines that the retrieval QA confidence score associated with the answer does not satisfy the threshold at step/operation 808, the QA computing entity 65 may request a human (for example, an expert) to input an answer to the question at step/operation 814. For example, the QA computing entity 65 may transmit the question to one of the user computing entities 30 via the networks 135, and an expert may input an answer to the question through one of the user computing entities 30 and the networks 135. In an alternative example, the expert may input the answer to the question via the QA computing entity 65. The QA computing entity 65 may then transmit the answer via the networks 135 to the one or more user computing entities 30 as shown in FIG. 1.

Further, the QA computing entity 65 may generate a QA pair at step/operation 816 based on the input question at step/operation 802 and the answer provides by the expert in response to the question at step/operation 814. The QA computing entity 65 may further store the QA pair at step/operation 816 to the training data 215 stored in the storage media 207.

As described above in connection with FIG. 7, the QA pairs stored in the training data 215 can be used to train or retrain the deep QA application 213 (e.g., deep QA model 213) and improve the accuracy of answers generated by the deep QA application 213 (e.g., deep QA model 213). For example, when a Question-Answer (QA) pair is feed into the deep QA application 213 (e.g., deep QA model 213), the deep QA application 213 (e.g., deep QA model 213) adjusts the weight(s) associated with node(s) in its artificial neural network such that the deep QA application 213 (e.g., deep QA model 213) identifies the Answer in the QA pair as the most likely correct answer to questions similar to the Question in the QA pair.

Referring now to FIG. 9, an example method 900 illustrates operations of the hybrid QA application 211 in the hybrid QA platform/system 100 in accordance with various embodiments of the present invention.

At step/operation 901, the QA computing entity 65 includes means, such as the communications interface 208, for receiving a question as an input to the hybrid QA application 211. For example, a user may input a question through one of the user computing entities 30 as shown in FIG. 1, and the QA computing entity 65 may receive the question via the networks 135. In various embodiments, the question may be posed in natural language form.

In response to receiving the question, the QA computing entity 65 includes means, such as one or more processing elements 205 and the memory element 206, for generating an answer to the question using a deep QA application. For example, the hybrid QA application 211 may comprise computer program instructions that, when executed by one or more processing elements 205, cause the QA computing entity 65 to generate an answer and a corresponding score using the deep QA application 213 (e.g., deep QA model 213). The deep QA application 213 (e.g., deep QA model 213) may generate an answer and a corresponding score to the question based on various embodiments of the present disclosure, including, for example, as described in connection with FIGS. 5-6. Referring back to FIG. 9, the answer generated by the deep QA application 213 (e.g., deep QA model 213) is labeled as Candidate Answer 1 at step/operation 903.

The QA computing entity 65 also includes means, such as one or more processing elements 205 and the memory element 206, for simultaneously generating an answer to the question using a retrieval QA application. For example, the hybrid QA application 211 may comprise computer program instructions that, when executed by one or more processing elements 205, cause the QA computing entity 65 to generate an answer by the retrieval QA application 212. The retrieval QA application 212 may generate an answer to the question based on various embodiments of the present disclosure, including those described in connection with FIG. 4. For example, the retrieval QA application 212 may perform retrieval operation on the document collection 214 using search query formulated based on the question at step/operation 901. Referring back to FIG. 9, the answer generated by the retrieval QA application 212 is labeled as Candidate Answer 2 at step/operation 905.

At step/operation 907, the QA computing entity 65 may request an expert to choose an answer between Candidate Answer 1 (generated by the deep QA application 213 (e.g., deep QA model 213)) and Candidate Answer 2 (generated by the retrieval QA application 212). For example, the QA computing entity 65 may transmit the question and both answers to one of the user computing entities 30 via the networks 135, and an expert may select one of the answers through one of the user computing entities 30 and the networks 135. In an alternative example, the question and both answers are presented on the QA computing entity 65, and the expert input a selection of one of the two answers.

At step/operation 909, the QA computing entity 65 includes means, such as one or more processing elements 205 and the memory element 206, for generating a QA pair based on the expert input choice at step/operation 907. For example, if the expert chooses Candidate Answer 2 (generated by the retrieval QA application 212), the QA computing entity 65 may generate a QA pair that includes the question at step/operation 901 and Candidate Answer 2 at step/operation 905. After the QA pair is generated, the QA computing entity 65 includes means, such as one or more processing elements 205, the memory element 206, and the storage media 207, for adding the QA pair to the training data 215. As described above, the training data 215 may be used to train or retrain the deep QA application 213 (e.g., deep QA model 213) to improve its accuracy in generating answers.

At step/operation 911, the QA computing entity 65 may output the answer that is chosen by the expert at step/operation 907. For example, the QA computing entity 65 may transmit the answer via the networks 135 to the one or more user computing entities 30 as shown in FIG. 1.

As presented in FIGS. 8-9, the feedback loop of embodiments of the present invention provides several technical advantages. For example, by creating QA pairs based on the answers generated by the retrieval QA application 212 that satisfy a predetermined/configurable threshold, the hybrid QA platform/system 100 automatically and regularly improves the performance of the deep QA application 213 (e.g., deep QA model 213). As such, the hybrid QA platform/system 100 solves technical challenges in training the deep QA application 213 (e.g., deep QA model 213), and the deep QA application 213 (e.g., deep QA model 213) may be improved to such a state that it provides full question-answering capabilities.

Further, the hybrid QA application 211, in accordance with various embodiments of the present invention, frees up human agents (e.g. customer representatives) at call centers, allowing representatives to take their time and provide better customer service. Business chat-bot applications can also reduce average call times and provide cost savings. In other words, various embodiments of the present invention improve customer engagement with minimized costs, and provide cross-industry impact with technical advantages over existing question-answering systems.

VI. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
   receiving, by one or more processors, an input question originating from a user computing entity;
   generating, by the one or more processors and using a deep question answering (QA) application, a deep learning answer and a deep learning confidence score for the deep learning answer, wherein (a) the deep QA application comprises an artificial neural network, and (b) the deep learning answer is generated by the artificial neural network for the input question;
   determining, by the one or more processors, that the deep learning confidence score for the deep learning answer does not satisfy a configurable deep QA threshold associated with a likelihood that the deep learning answer generated using the deep QA application is a correct answer to the input question;
   querying, by the one or more processors, a retrieval QA application for a retrieved answer, wherein (a) the retrieval QA application identifies the retrieved answer at least in by ranking a plurality of documents responsive to the querying, and generates a plurality of retrieval confidence scores for the plurality of documents respectively, and (b) the retrieved answer comprises a highest retrieval confidence score of the plurality of retrieval confidence scores;
   responsive to determining, by the one or more processors, that the highest retrieval confidence score for the retrieved answer satisfies a retrieval confidence score threshold, providing, by the one or more processors, the retrieved answer from the retrieval QA application as an answer from a hybrid QA platform to the input question, wherein the hybrid QA platform comprises the retrieval QA application and the deep QA application; and
   responsive to determining, by the one or more processors, that the highest retrieval confidence score for the retrieved answer does not satisfy the retrieval confidence score threshold, requesting, by the one or more processors, an expert user answer by transmitting the input question to a user computing entity associated with an expert user;
   identifying, by the one or more processors, a plurality of retrieved answers, wherein (a) one or more of the plurality of retrieved answers satisfies a training threshold associated with a quality of the plurality of retrieved answers being suitable for generating training data for the deep QA application and (b) the plurality of retrieved answers comprises the retrieved answer;
   generating, by the one or more processors, training data for the artificial neural network, wherein the training data comprises one or more training question-answer pairs, each comprising a respective question and a corresponding respective answer, for respective one or more retrieved answers in the plurality of retrieved answers, wherein one of the one or more training question-answer pairs comprises the input question and the retrieved answer; and
   initiating, by the one or more processors, the performance of training the artificial neural network based at least in part on the training data, wherein initiating the performance of training comprises, for the one or more training question-answer pairs in the training data: (i) generating a comparison measure between the corresponding respective answer and the deep learning answer, and (ii) updating trainable weights of the artificial neural network based at least in part on the comparison measure.

2. The computer-implemented method of claim 1, wherein the retrieval QA application identifies the retrieved answer based at least in part on:
   analyzing, by the one or more processors, the input question;
   generating, by the one or more processors, a document retrieval query based at least in part on the input question;
   querying, by the one or more processors, a document collection based at least in part on the document retrieval query;
   identifying, by the one or more processors, one or more relevant documents from the document collection; and extracting, by the one or more processors, one or more candidate answers based at least in part on the one or more relevant documents.

3. The computer-implemented method of claim 2, wherein extracting one or more candidate answers comprises ranking the one or more relevant documents from the document collection and processing a subset of the one or more relevant documents based at least in part on the ranking.

4. The computer-implemented method of claim 1, wherein the retrieval QA application identifies the retrieved answer at least in part by determining whether an answer type of the retrieved answer matches a question type of the input question.

5. The computer-implemented method of claim 1, wherein the retrieval QA application identifies the retrieved answer at least in part by (i) generating a search query based at least in part on the input question, (ii) retrieving one or more documents from one or more document collections based at least in part on the search query, and (iii) generating one or more retrieved answers based at least in part on the one or more documents.

6. The computer-implemented method of claim 1, wherein the retrieval confidence score threshold is equal to the configurable deep QA threshold.

7. The computer-implemented method of claim 1 wherein one of the one or more training question-answer pairs comprises the input question and the expert user answer.

8. At least one non-transitory computer readable medium having computer program instructions stored therein, the computer program instructions when executed by one or more processors, cause the one or more processors to:
receive an input question originating from a user computing entity;
generate, using a deep question-answering (QA) application, a deep learning answer and a deep learning confidence score for the deep learning answer wherein (a) the deep QA application comprises an artificial neural network, and (b) the deep learning answer is generated by the artificial neural network for the input question;
determining that the deep learning confidence score for the deep learning answer does not satisfy a configurable deep QA threshold associated with a likelihood that the deep learning answer generated using the deep QA application is a correct answer to the input question;
query a retrieval QA application for a retrieved answer, wherein (a) the retrieval QA application identifies the retrieved answer at least in part by ranking a plurality of documents responsive to the query and generates a plurality of retrieval confidence scores for the plurality of documents respectively, and (b) the retrieved answer comprises a highest retrieval confidence score of the plurality of retrieval confidence scores;
responsive to determining that the highest retrieval confidence score for the retrieved answer satisfies a retrieval confidence score threshold, provide the retrieved answer from the retrieval QA application as an answer from a hybrid QA platform to the input question, wherein the hybrid QA platform comprises the retrieval QA application and the deep QA application; and
responsive to determining that the highest retrieval confidence score for the retrieved answer does not satisfy the retrieval confidence score threshold, request an expert user answer by transmitting the input question to a user computing entity associated with an expert user;
identify a plurality of retrieved answers, wherein (a) one or more of the plurality of retrieved answers satisfies a training threshold associated with a quality of the plurality of retrieved answers being suitable for generating training data for the deep QA application and (b) the plurality of retrieved answers comprises the retrieved answer;
generate training data for the artificial neural network, wherein the training data comprises one or more training question-answer pairs, each comprising a respective question and a corresponding respective answer, for respective one or more retrieved answers in the plurality of retrieved answers, wherein one of the one or more training question-answer pairs comprises the input question and the retrieved answer; and
initiate the performance of training the artificial neural network based at least in part on the training data, wherein initiating the performance of training comprises, for the one or more training question-answer pairs in the training data: (i) generating a comparison measure between the corresponding respective answer and the deep learning answer, and (ii) updating trainable weights of the artificial neural network based at least in part on the comparison measure.

9. The at least one non-transitory computer readable storage medium of claim 8, wherein the retrieval QA application identifies the retrieved answer based at least in part on:
analyzing the input question;
generating a document retrieval query based at least in part on the input question;
querying a document collection based at least in part on the document retrieval query;
identifying one or more relevant documents from the document collection; and
extracting one or more candidate answers based at least in part on the one or more relevant documents.

10. The at least one non-transitory computer readable medium of claim 9, wherein extracting one or more candidate answers comprises ranking the one or more relevant documents from the document collection and processing a subset of the one or more relevant documents based at least in part on the ranking.

11. The at least one non-transitory computer readable storage medium of claim 8, wherein the retrieval QA application identifies the retrieved answer at least in part by determining whether an answer type of the retrieved answer matches a question type of the input question.

12. The at least one non-transitory computer readable storage medium of claim 7, wherein the retrieval QA application identifies the retrieved answer at least in part by (i) generating a search query based at least in part on the input question, (ii) retrieving one or more documents from one or more document collections based at least in part on the search query, and (iii) generating one or more retrieved answers based at least in part on the one or more documents.

13. The at least one non-transitory computer readable storage medium of claim 8, wherein the retrieval confidence score threshold is equal to the configurable deep QA threshold.

14. A computing system comprising a non-transitory computer readable storage medium and one or more processors, the computing system configured to:
receive an input question originating from a user computing entity;

generate, using a deep question-answering (QA) application, a deep learning answer and a deep learning confidence score for the deep learning answer, wherein (a) the deep QA application comprises an artificial neural network, and (b) the deep learning answer is generated by the artificial neural network for the input question;

determining that the deep learning confidence score for the deep learning answer does not satisfy a configurable deep QA threshold associated with a likelihood that the deep learning answer generated using the deep QA application is a correct answer to the input question;

query a retrieval QA application for a retrieved answer, wherein (a) the retrieval QA application identifies the retrieved answer at least in part by ranking a plurality of documents responsive to the query and generates a plurality of retrieval confidence scores for the plurality of documents respectively, and (b) the retrieved answer comprises a highest retrieval confidence score of the plurality of retrieval confidence scores; and responsive to determining that the highest retrieval confidence score for the retrieved answer satisfies a retrieval confidence score threshold, provide the retrieved answer from the retrieval QA application as an answer from a hybrid QA platform to the input question, wherein the hybrid QA platform comprises the retrieval QA application and the deep QA application; and responsive to determining that the highest retrieval confidence score for the retrieved answer does not satisfy the retrieval confidence score threshold, request an expert user answer by transmitting the input question to a user computing entity associated with an expert user;

identify a plurality of retrieved answers, wherein (a) one or more of the plurality of retrieved answers satisfies a training threshold associated with a quality of the plurality of retrieved answers being suitable for generating training data for the deep QA application and (b) the plurality of retrieved answers comprises the retrieved answer;

generate training data for the artificial neural network, wherein the training data comprises one or more training question-answer pairs, each comprising a respective question and a corresponding respective answer, for respective one or more retrieved answers in the plurality of retrieved answers, wherein one of the one or more training question-answer pairs comprises the input question and the retrieved answer; and initiate the performance of training the artificial neural network based at least in part on the training data, wherein initiating the performance of training comprises, for the one or more training question-answer pairs in the training data: (i) generating a comparison measure between the corresponding respective answer and the deep learning answer, and (ii) updating trainable weights of the artificial neural network based at least in part on the comparison measure.

15. The computing system of claim 14, wherein the retrieval QA application identifies the retrieved answer based at least in part on:

analyzing the input question;

generating a document retrieval query based at least in part on the input question;

querying a document collection based at least in part on the document retrieval query;

identifying one or more relevant documents from the document collection; and extracting one or more candidate answers based at least in part on the one or more relevant documents.

16. The computing system of claim 15, wherein extracting the one or more candidate answers comprises ranking the one or more relevant documents from the document collection and processing a subset of the one or more relevant documents based at least in part on the ranking.

17. The computing system of claim 14, wherein the retrieval QA application identifies the retrieved answer at least in part by determining whether an answer type of the retrieved answer matches a question type of the input question.

18. The computing system of claim 14, wherein the retrieval QA application identifies the retrieved answer at least in part by (i) generating a search query based at least in part on the input question, (ii) retrieving one or more documents from one or more document collections based at least in part on the search query, and (iii) generating one or more retrieved answers based at least in part on the one or more documents.

19. The computing system of claim 14, wherein the retrieval confidence score threshold is equal to the configurable deep QA threshold.

* * * * *

UNITED STATES PATENT AND TRADEMARK OFFICE
CERTIFICATE OF CORRECTION

| | |
|---|---|
| PATENT NO. | : 11,921,761 B2 |
| APPLICATION NO. | : 16/178719 |
| DATED | : March 5, 2024 |
| INVENTOR(S) | : Ravi Kondadadi et al. |

It is certified that error appears in the above-identified patent and that said Letters Patent is hereby corrected as shown below:

In the Claims

In Column 26, Line 52, Claim 12, delete "claim 7," and insert -- claim 8, --, therefor.

Signed and Sealed this
Twenty-eighth Day of May, 2024

Katherine Kelly Vidal
*Director of the United States Patent and Trademark Office*